United States Patent [19]

Takahashi

[11] Patent Number: 5,093,873
[45] Date of Patent: Mar. 3, 1992

[54] ELECTRONIC FILING APPARATUS USING PART OF READ IMAGE INFORMATION AS RETRIEVAL INFORMATION

[75] Inventor: Masaharu Takahashi, Yokohama, Japan

[73] Assignee: Kabushiki Kaisha Toshiba, Kawasaki, Japan

[21] Appl. No.: 634,486

[22] Filed: Dec. 27, 1990

[30] Foreign Application Priority Data

Dec. 28, 1989 [JP] Japan .................................. 1-344422

[51] Int. Cl.⁵ .......................................... G06K 9/20
[52] U.S. Cl. ........................................ 382/61; 382/9; 382/16; 340/711
[58] Field of Search ............... 382/61, 9, 16, 56, 47, 382/48, 62; 358/443, 453; 340/711, 710, 709, 730; 364/522; 235/375

[56] References Cited

U.S. PATENT DOCUMENTS

| | | | |
|---|---|---|---|
| 4,408,181 | 10/1983 | Nakayama | 382/61 |
| 4,574,395 | 3/1986 | Kato | 382/61 |
| 4,941,195 | 7/1990 | Tanaka et al. | 382/61 |
| 4,963,996 | 10/1990 | Bannai | 382/61 |

Primary Examiner—Michael Razavi
Attorney, Agent, or Firm—Finnegan, Henderson, Farabow, Garrett, and Dunner

[57] ABSTRACT

An area of image information read by a scanner is designated by a mouse to designate a part of the image information as retrieval information. The designated part of the image information is recognized in an OCR as the retrieval information which is then stored in an information recording medium in association with the image information.

8 Claims, 3 Drawing Sheets

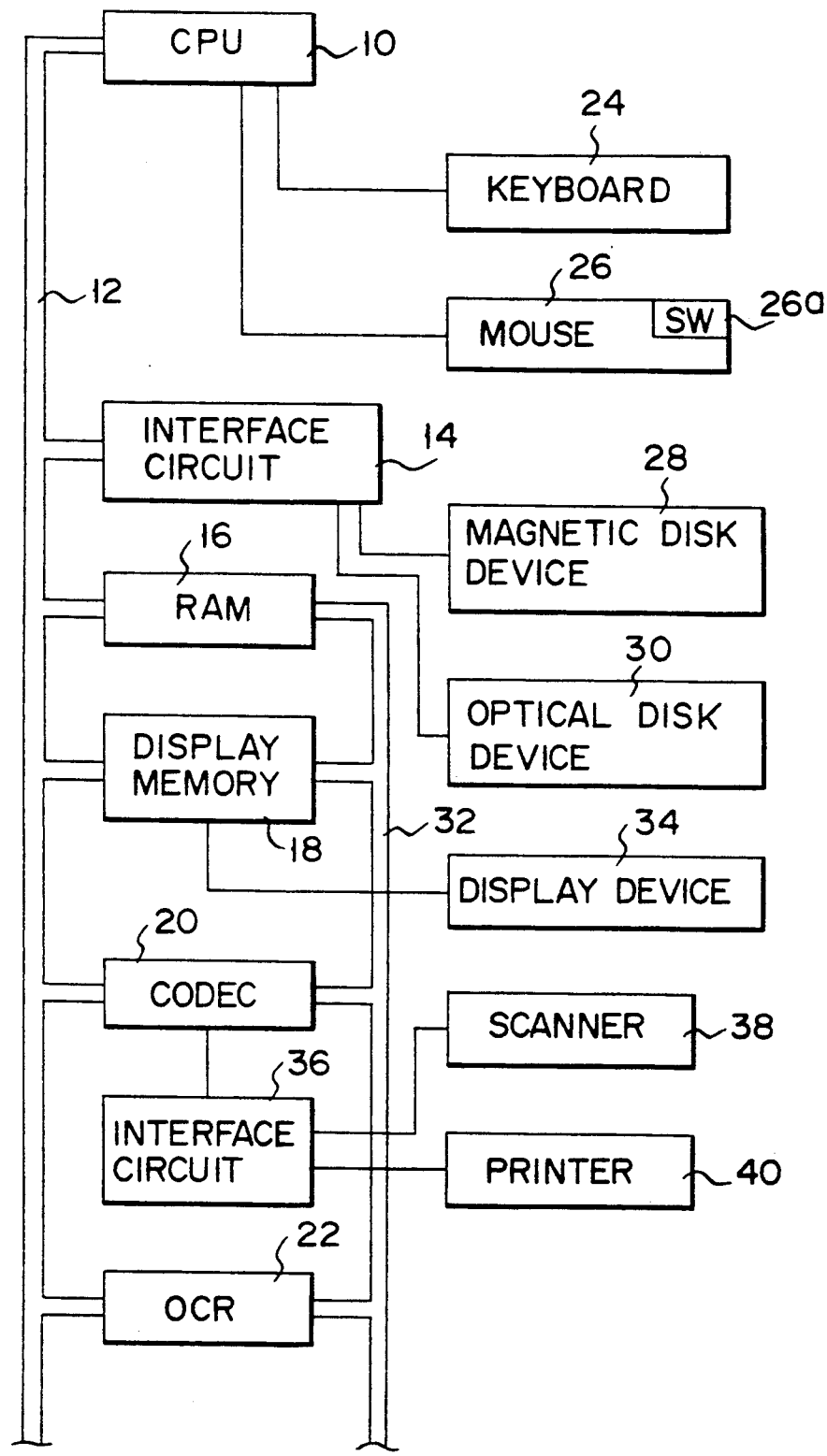
F I G. 1

ELECTRONIC FILING APPARATUS USING PART OF READ IMAGE INFORMATION AS RETRIEVAL INFORMATION

BACKGROUND OF THE INVENTION

1. Field of the Invention

The present invention relates to an electronic filing apparatus for affixing retrieval information to image information, read out by, for example, a scanner, and recording such information on an optical disk.

2. Description of the Related Art

Recently, an electronic filing apparatus using an optical disk has been put to practice as an apparatus capable of optically recording (registering) and reproducing (retrieving) a vast amount of information, such as documents prepared in offices.

The electronic filing apparatus of this type affixes retrieval information to image information to be registered on an optical disk. This retrieval information is to be entered through a keyboard by an operator based on the content of information to be registered mainly at the information storage time.

The input of the retrieval information, however, requires the operator to judge which part of the to-be-registered information would be the retrieval information while viewing the information and to operate the keyboard based on the content of the judgment. This method takes time to enter the retrieval information and deteriorates the input efficiency.

According to the prior art, again, it takes time to input retrieval information, resulting in lower efficiency.

SUMMARY OF THE INVENTION

It is therefore an object of the present invention to provide an electronic filing apparatus capable of reducing the work of an operator to enter retrieval information and shorten the inputting time.

To achieve this object, the electronic filing apparatus according to the present invention comprises an electronic filing apparatus for recording on an information recording medium image information and associated retrieval information and for retrieving desired image information from the information recording medium by designating the recorded retrieval information, comprising: read means for successively reading a plurality of items of image information to be recorded; first means for temporarily storing the image information read by the read means; designation means for designating an area including a part of the image information; second means for temporarily storing area information relating to the area designated by the designating means, the second means being held to store the information temporarily stored therein when no next area of the image information is designated; recognition means for recognizing the part of the information in the designated area as retrieval information based on the area information temporarily stored in the second means in the image information stored temporarily in the first means; and third means for recording the retrieval information recognized by the recognition means on the information recording medium in association with the image information.

According to the present invention with the above arrangement, when a part of the image information which can be used as retrieval information exists in the image information to be processed, this part of the image information is recognized and input as such. It is therefore possible to automatically input retrieval information without using a keyboard.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram illustrating the structure of an electric circuit of an electronic filing apparatus according to one embodiment of the present invention;

DETAILED DESCRIPTION OF THE PREFERRED EMBODIMENTS

Figure 2:
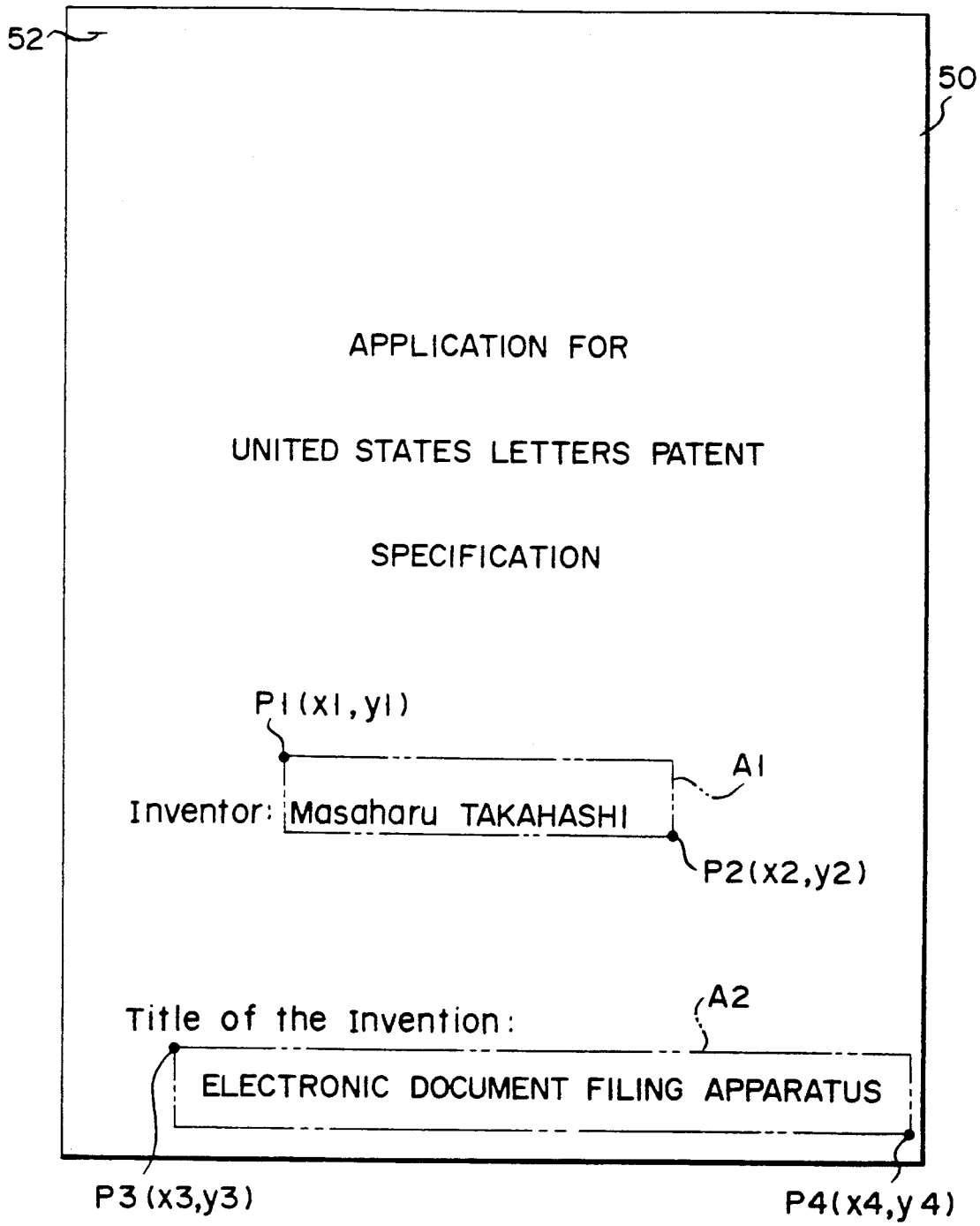
FIG. 2 is a diagram exemplifying a original to be scanned by the apparatus of this embodiment shown in FIG. 1.

One preferred embodiment of the present invention will now be described referring to FIGS. 1 through 3. Referring to FIG. 1, a CPU 10, which serves to perform the general control of the electronic filing apparatus, is connected via a system bus 12 to an interface circuit 14, a RAM 16, a display memory 18, a CODEC 20 and an OCR (Optical Character Reader) 22. The CPU 10 is also connected to a keyboard 24 and a mouse 26.

The interface circuit 14 serves to couple a magnetic disk device 28 for storing retrieval information (to be described later) and an optical disk device 30 for storing a vast amount of image information such as documents to the CPU 10 and the other units 16, 18, 20, etc. via the system bus 12. The RAM 16, display memory 18, CODEC 20 and OCR 22 are mutually connected via an image bus 32. To the display memory 18 is connected a display device 34 having a CRT to display image information, retrieval information, etc. The CODEC 20 is connected via an interface circuit 36 to a scanner 38 and a printer 40. The scanner 38 serves to read out the contents of an original, such as a photograph or a document, as image information. The printer 40 prints out the image information as visible information on a recording medium such as a recording sheet of paper.

Referring now to the flowchart given in FIG. 3, a description will be given of the operation to scan an original 50 shown in FIG. 2 by means of the scanner 38 and record the scanned information as image information on the optical disk device 30, and store image information in specific locations A1 and A2 on the original 50 as retrieval information on the magnetic disk device 28.

The original 50 in FIG. 2 is the first page of one U.S. patent specification, and is placed on the scanner 38 and scanned, providing image information. The acquired image information is supplied via the interface circuit 36 to the CODEC 20 and is temporarily stored in the RAM 16 under the control of the CPU 10. The image information stored in the RAM 16 is read out by the CPU 10, and is stored in the display memory 18 so that it is displayed on the display device 34 as shown in FIG. 2.

At the first step ST1, a cursor 52 is also displayed on the image of the original 50 displayed as shown in FIG. 2, and this cursor 52 is movable anywhere on the image of the original 50 by operating the mouse 26. The cursor 52 is moved on the image of the original 50 on the display device 34 to the start point P1 of an elongated first retrieval information designation area A1. This area A1 is set to store the name of the inventor ("Masaharu TAKAHASHI" in this case) as one piece of retrieval information. Whether or not the operator presses a switch 26a on the mouse 26 is checked at next step ST2 when the cursor 52 is positioned to the start point P1. At next step ST3, position data P1 (x1, y1) of this point P1 is fetched by the CPU 10 and is stored in the RAM 16.

Then, the operator moves the cursor 52 to an end point P2 of the area A1 operating the mouse 26. Likewise, position data P2 (x2, y2) of this point P2 is fetched and stored in the RAM 16. In the above manner, the inventor's name, which would be input by operating the keys on the keyboard 24 by the operator according to the prior art, is specified as partial image information in the area A1 of the entire image information of the original 50.

In registering multiple pieces of original information each being the first page of the specification as shown in FIG. 2, various inventor's names would be displayed in the area A1. Since inventors' names are not generally very long, properly setting the position of the end point P2 can place every inventor's name within the area A1. In other words, when there are multiple sheets of originals of a constant form to be registered and the position of partial image information which can be retrieval information of each original is fixed, the position data P1 (x1, y1) and P2 (x2, y2) set for the first original can also be used for all the remaining originals.

At next step ST4, whether or not another area is designated in the original 50 is checked. If YES, after the position data about the area A1 is stored in the RAM 16, the cursor 52 is moved to a start point P3 of a next area A2 and its position data P3 (x3, y3) is fetched in the RAM 16 upon depression of the switch 26a of the mouse 26. In this area A2 the title of the invention, which is used as retrieval information, is included as partial image information. Likewise, the cursor 52 is moved to an end point P4 of the area A2 and its position data P4 (x4, y4) is fetched in the RAM 16.

Figure 3:
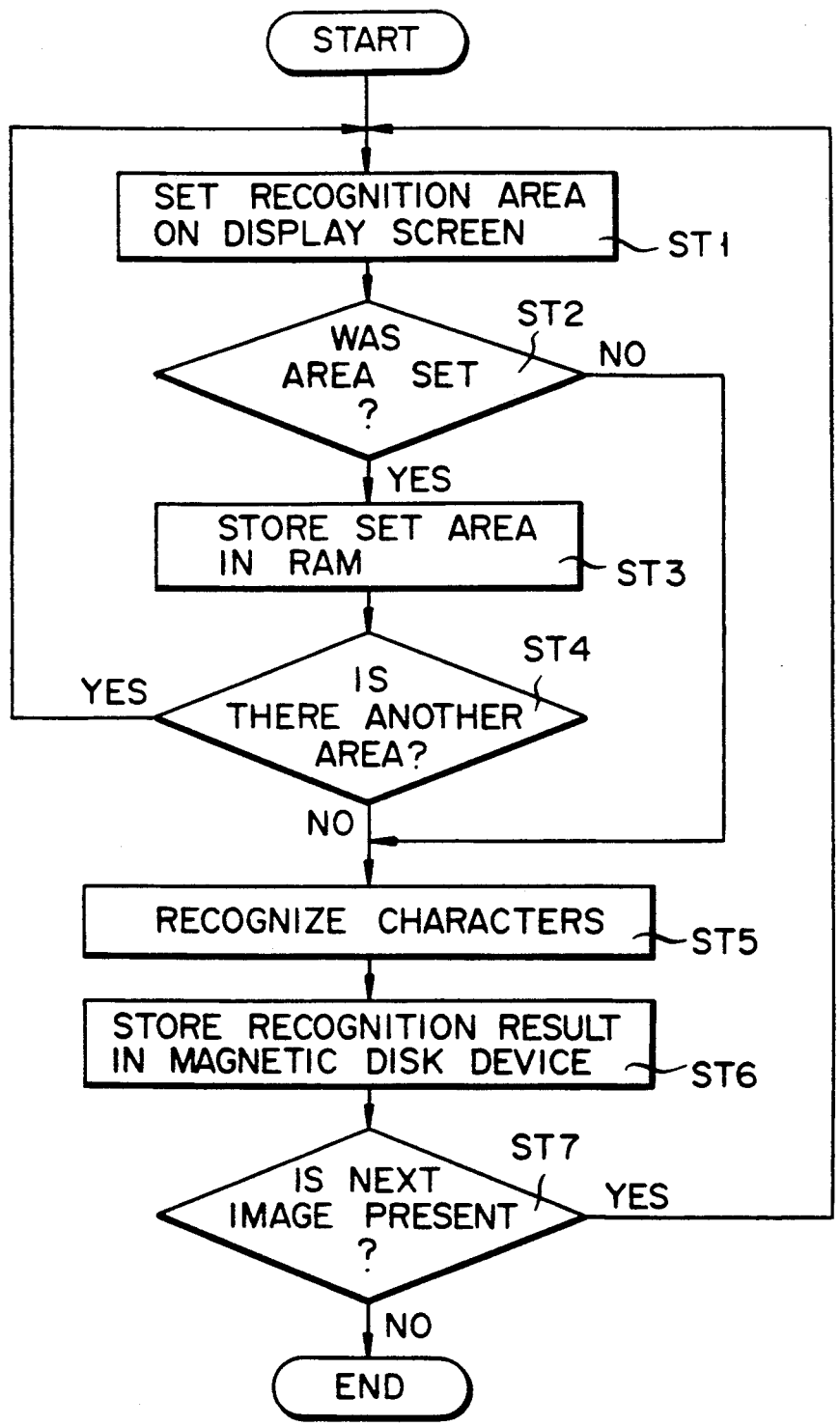
FIG. 3 is a flowchart for explaining the operation of the apparatus shown in FIG. 1.

Setting the areas A1 and A2 which contain position data to be recognized as retrieval information is executed in the above manner in the steps ST1 to ST4 in FIG. 3.

When the setting of the areas A1 and A2 is completed, the flow advances to the next step ST5 where characters in the areas A1 and A2 are recognized, coded, then stored as retrieval information on the magnetic disk device 28.

First, the position data of the start point P1 and end point P2 of the area A1 are read out from the RAM 16, and are supplied to the RAM 16 as address designation data of the partial image information corresponding to the area A1 of the image information of the original 50 stored in a different location of the RAM 16. As a result, position data including a sequence of characters "Masaharu TAKAHASHI" is read out from the RAM 16, then sent to the OCR 22. In the subsequent step ST6, the image information in the area A1 is read out as a character sequence "Masaharu TAKAHASHI" and is converted into ASCII code data, which is in turn stored as retrieval information of the original 50 on the magnetic disk device 28.

Likewise, if YES is obtained at next step ST7, the partial image information in the area A2 is read out from the RAM 16 using the position data P3 (x3, y3) and P4 (x4, y4), converted into code data by the OCR 22, then stored as another retrieval information on the magnetic disk device 28.

If the originals following the second sheet inclusive are the first pages of different U.S. patent specifications of the same format as that of the original 50 shown in FIG. 2, the same position data of the areas A1 and A2 as already stored for the first original can be used, thus eliminating the need to set these areas repeatedly. Accordingly, the operation of inputting retrieval information may by automatically executed for the originals following the second one inclusive.

As described above, when image information to be processed contains partial image information such as characters which can be retrieval information, this partial image information is recognized and is input as retrieval information.

More specifically, designating part of image information as an area that should be recognized permits the operator to input the retrieval information without actually having or typing in it. This can allow the operator to enter retrieval information without using the keyboard, thus reducing the work of the operator and ensuring high-speed processing regardless of the processing ability of the operator. It is therefore possible to realize an electronic filing apparatus which can shorten the time of inputting the retrieval information and thus process information with remarkably high efficiency.

Although the foregoing description of the embodiment has been given with reference to a case where image data is recognized as a character pattern, this invention is not limited to this particular case. For instance, data such as bar codes may be recognized and coded as well.

Further, the pattern recognition of characters or the like is not restricted to the above-described case of carrying out the pattern recognition using the OCR incorporated in the electronic filing apparatus. For instance, the pattern recognition section may be designed to be incorporated in an image scanner, or designed to be an external, separate unit.

The present invention can be modified in various other manners without departing from the scope and spirit of the invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image information processing apparatus for recording, on an information recording medium, image information and associated retrieval information, and for retrieving desired image information from the information recording medium by designating the recorded retrieval information, the apparatus comprising:

read means for successively reading image information to be recorded, said image information to be recorded not including a retrieval data area;

first storing means for temporarily storing the image information read by said read means;

designation means for designating an area which is a part of the image information to be recorded;

second storing means for temporarily storing area information relating to the area designated by said designation means, said second storing means storing the area information temporarily stored therein until a new area of the image information is designated;

recognition means for recognizing the part of the image information to be recorded which is the designated area as retrieval information based on the area information temporarily stored in said second storing means and the image information to be recorded which is stored temporarily in said first storing means; and means for recording the retrieval information recognized by said recognition means on said information recording medium in association with the image information to be recorded.

2. An image information processing apparatus according to claim 1, wherein said designation means includes:

means for displaying image information together with a cursor;

means for moving said cursor to start and end points of said area; and switch means, provided on said moving means, for generating an instruction signal to fetch position data of said start and end points.

3. An image information processing apparatus according to claim 1, wherein said recognition means includes an optical character reader for executing pattern recognition to recognize image information in said area as a sequence of characters and outputting said image information as ASCII codes.

4. An image information recording apparatus for recording, on an information recording medium, image information and associated retrieval information, the apparatus comprising:

read means for successively reading image information to be recorded, said image information to be recorded not including a retrieval data area;

first storing means for temporarily storing the image information read by said read means;

designation means for designating an area which is a part of the image information to be recorded;

second storing means for temporarily storing area information relating to the area designated by said designation means, said second storing means storing the area information temporarily stored therein until a new area of the image information is designated;

recognition means for recognizing the part of the image information to be recorded which is the designated area as retrieval information based on the area information to be recorded stored temporarily in said first storing means; and means for recording the retrieval information recognized by said recognition means on said information recording medium in association with the image information to be recorded.

5. An image information recording apparatus according to claim 4, wherein said designation means includes:

means for displaying image information together with a cursor;

means for moving said cursor to start and end points of said area; and switch means, provided on said moving means, for generating an instruction signal to fetch position data of said start and end points.

6. An image information recording apparatus according to claim 4, wherein said recognition means includes an optical character reader for executing pattern recognition to recognize image information in said area as a sequence of characters and outputting said image information as ASCII codes.

7. An image information processing apparatus comprising:

means for reading out image information from an original;

first storing means for storing the image information read out from the original;

means for displaying, on a screen, the read out image information and a cursor which is movable to a desired position on the read out image information;

means for moving the cursor to two specified positions on the screen to designate the two specified positions;

second storing means for storing the read out image information and position information corresponding to the designated two specified positions;

means for reading out from said second storing means partial image information corresponding to a partial image contained in a rectangular area having diagonal points corresponding to the two specified positions on said screen according to the position information stored in said second storing means;

means for recognizing a sequence of characters contained in the partial image information read out from said second storing means in order to convert the sequence of characters into code date; and third storing means for storing the code data as data for retrieving the image information rom said second storing means.

8. An image information processing apparatus comprising:

first reading means for successively reading out, as image information, contents of a sequence of originals having a standard format;

first storing means for successively storing the contents read out by said reading means;

means for displaying on a screen the read out image information and a cursor which is movable to two specified positions in the image information to designate the two specified positions;

means for moving the cursor to the two specified positions in the image information displayed on the screen in order to designate the two specified positions;

second storing means for storing the two specified positions with respect to the read out image information and the image information of the sequence of originals;

second reading means for reading out from said second storing means, for each image information read out by said first reading means, partial image information corresponding to a partial image contained in a rectangular area having two diagonal points defined by the two specified positions on the screen according to the two specified positions stored in said second storing means;

means for successively recognizing a sequence of characters contained in the partial image information read out by second said reading means in order to convert the sequence of characters into code data; and third storing means for successively storing the code data as data for retrieving the image information stored in said second storing means.

* * * * *